SYSTEM FOR AUTOMATIC CORRECTION OF BURST ERRORS

Filed Feb. 18, 1965 3 Sheets-Sheet 1

INVENTOR.
CHITOOR V. SRINIVASAN
BY
Samuel Cohen
Attorney

SYSTEM FOR AUTOMATIC CORRECTION OF BURST ERRORS

INVENTOR.
CHITOOR V. SRINIVASAN
BY Samuel Cohen
Attorney

INVENTOR
CHITOOR V. SRINIVASAN
BY
Samuel Cohen
Attorney

United States Patent Office 3,404,373 Patented Oct. 1, 1968

3,404,373

SYSTEM FOR AUTOMATIC CORRECTION OF BURST ERRORS

Chitoor V. Srinivasan, Trenton, N.J., assignor to Radio Corporation of America, a corporation of Delaware Filed Feb. 18, 1965, Ser. No. 433,709
4 Claims. (Cl. 340—146.1)

ABSTRACT OF THE DISCLOSURE

Each transmitted word consists of two parts, an information word having $n$ binary digits (bits) $x_0 \ldots x_{n-1}$ and a code word having $n$ bits $a_0 \ldots a_{n-1}$. Each $i$th code bit $a_i$ is equal to the modulo 2 sum of the $i$th information bit $x_i$ and the $$(i \underset{n}{\oplus} 1)\text{th}$$

information bit $$x_{i \underset{n}{\oplus} 1}$$

where:

$$(i \underset{n}{\oplus} 1)$$

is the modulo $n$ sum of $i$ and 1. The bits are preferably rearranged into a particular order prior to transmission. Each received bit $\tilde{x}_i$ is obtained by decoding the received information and code bits in accordance with the following expression:

$$\tilde{x}_i = \text{Maj.}\ (x'_i),\ (a'_i \oplus x'_{i \underset{n}{\oplus} 1}),\ (a'_{i \underset{n}{\ominus} 1} + x'_{i \underset{n}{\ominus} 1})$$

where $\underset{n}{\ominus}$ represents the modulo $n$ difference.

This invention relates generally to error correction, and particularly to burst error correction systems.

Batch fabrication processes for the production of electronics circuits are currently of considerable interest. They permit the manufacture of very large numbers of densely packed circuit elements, potentially at a relatively low per element cost. Examples of circuits made in this way include ferrite sheet memories; magnetic film and cryoelectric film memories; integrated thin film transistor storage systems, such as registers and the like; and so on. As a general, statistic proposition, the greater the number of elements made during a single batch-fabricating process, the greater the likelihood that one or more of the elements will be defective. Such defects, when they occur, are generally more likely to be present in a group or groups of closely adjacent elements.

Naturally, if a memory system with one or more defective storage locations is employed for the storage of binary information, the outputs obtained from the defective locations are likely to include errors. Moreover, these errors are likely to occur in bursts in batch-fabricated systems for reasons given above.

A specific object of the present invention is to provide a coding arrangement for the data stored in a memory and a decoding arrangement for the data read out of the memory which, together, automatically correct bursts of errors in the stored and/or read-out information.

A more general object of the invention is to provide a coding arrangement for transmitted data and a decoding arrangement for received data which, together, automatically correct bursts of erors in the data.

Another object of the invention is to provide encoding and decoding apparatuses which are relatively simple in structure and which insert relatively small delays.

Another object of the invention is to provide a decoding network which is capable of masking some of the errors arising in the network itself.

Another object of the invention is to provide a new and improved error-correcting code.

The invention is discussed in greater detail below and is shown in the following drawings, of which:

FIGURES 1*a* and 1*b* are drawings showing two of the conventions employed in the remaining figures;

Figure 6A:
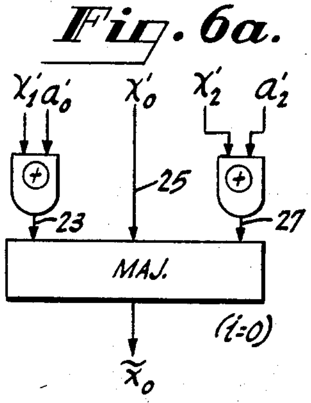
Figure 6B:
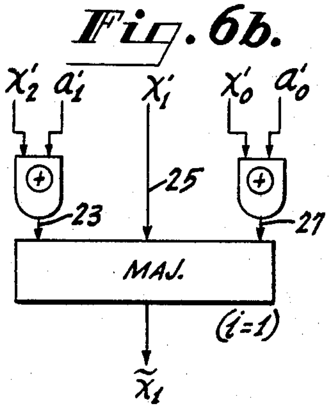
Figure 6C:
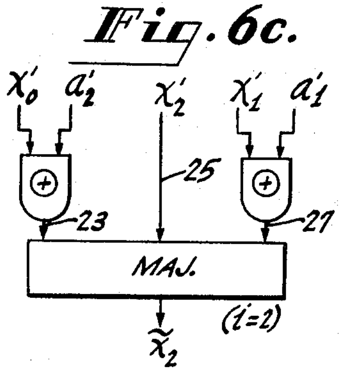
Figure 7:
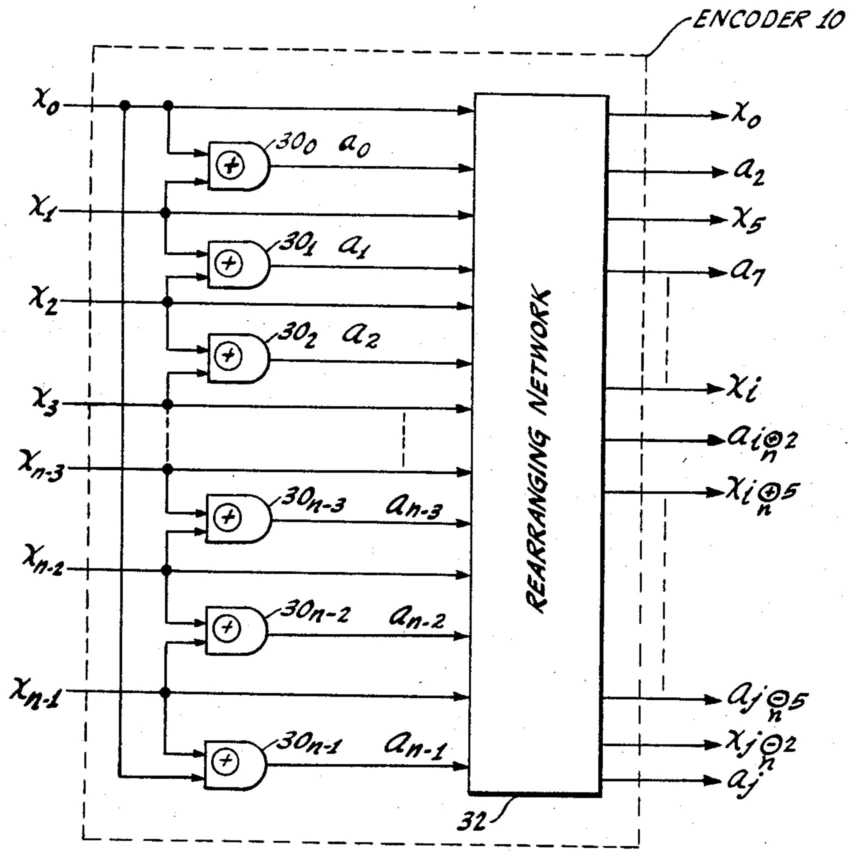

FIGURES 6*a*–6*c* are diagrams of decoder networks for the $x_0$, $x_1$ and $x_2$ information bits of a three-bit data transmission system; and FIGURE 7 is a diagram for an encoder, including a rearranging network, for a system according to the invention.

The circuits shown in the drawings include gates to which electrical signals indicative of bits are applied. To simplify the discussion which follows, the bits themselves are referred to rather than the signals manifesting the bits.

In the discussion of the invention below, the term "error," applied to a digit of a binary word, means that the digit does not have the same value at the input and output of a data transmission or storage channel. The term "burst error" means that the errors in a binary word occur in a substring of adjacent digits. If the burst error is of length $\alpha$, this implies that no substring of length $\alpha-1$ includes all the errors.

Figure 2:
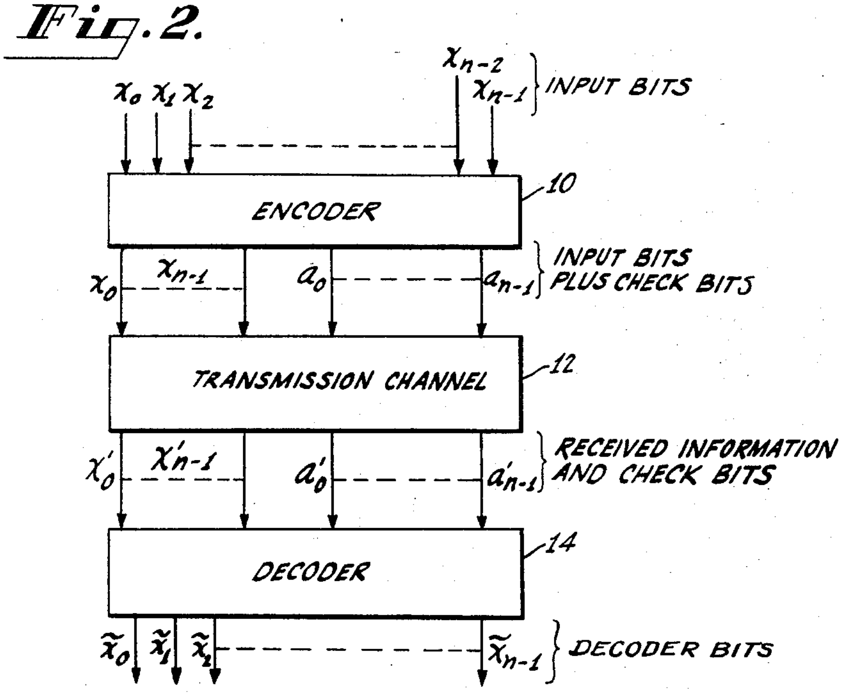
FIGURE 2 is a block circuit diagram of a system according to the present invention.

The system of the present invention is illustrated in general terms in FIGURE 2. It includes an encoder 10 which receives $n$ information bits $x_0 \ldots x_{n-1}$. The encoder derives from this input word an output word having $2n$ bits $x_0 \ldots x_{n-1}$, $a_0 \ldots a_{n-1}$, where $a_0 \ldots a_{n-1}$ is a code word consisting of $n$ check bits.

Figure 3:
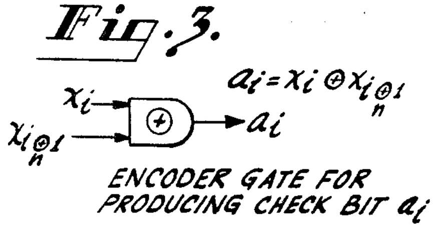
FIGURE 3 is a diagram of an encoder gate for the $i$th information bit $x_i$.
Figure 4:
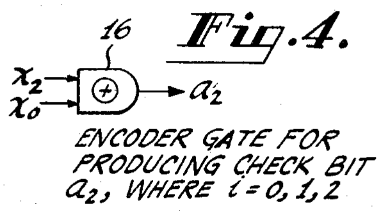
FIGURE 4 is an encoder gate for the third information bit $x_2$ in a system for transmitting three data bits $x_0, x_1, x_2$.

The relationship of the $a$ bits to the $x$ bits and the way in which the $a$ bits are obtained is discussed later in connection with FIGURES 3, 4 and 7. The encoder preferably also includes means for rearranging the positions of the $x$ and $a$ bits as discussed later.

The $2n$ bit word is applied to a transmission channel 12. In the general case, the transmission channel is imperfect either by virtue of noise present in the channel or because there are faulty transmission elements in the channel. In the case of particular interest here, the channel is a memory or other storage device in a digital computer, and there may be both imperfections and noise (half-select signals, for example) present in the channel.

The output of channel 12 consists of a word having $2n$ bits $$x'_0 \ldots x'_{n-1},\ a'_0 \ldots a'_{n-1}$$

While most of the $x'$ and $a'$ bits may be equal in value to the corresponding input bits $x$ and $a$ to the transmission channel, there may be some errors.

The $x'$ and $a'$ bits are applied to a decoder 14. Its function is to translate the $2n$ bit word $$x'_0 \ldots x'_{n-1},\ a'_0 \ldots a'_{n-1}$$

into an $n$ bit output word $x_0 \ldots x_{n-1}$ in which, ideally, all bits are correct. The circuits making up the decoder are discussed in more detail later in connection with FIGURES 5 and 6*a*–6*c*.

The burst error correcting code system of the present invention is derived from a single error-correcting coding arrangement, which in itself is also a new discovery, applicable to strings of three or more binary digits.

To keep the explanation simple, the case in which there are three information bits $x_0$, $x_1$ and $x_2$ is chosen for illustration to start with. The check bits $a_0$, $a_1$, $a_2$ associated with the information bits $x_0$, $x_1$, $x_2$ are obtained from the following expression:

$$a_i = x_i \oplus x_{i \underset{3}{\oplus} 1} \qquad (1)$$

where $i=0, 1, 2$. Put into words, Equation 1 states that the $i$th check bit $a_i$ is equal to the modulo 2 sum of the $i$th information bit $x_i$ and the $$(i \underset{3}{\oplus} 1)\text{th}$$

information bit, where $$\underset{3}{\oplus}$$

denotes the modulo 3 sum. In the case of $$i=0,\ a_0 = x_0 \oplus x_1$$

In the case of $i=1$, $a_1 = x_1 \oplus x_2$. In the case of $i=2$, $a_2 = x_2 \oplus x_0$ The encoder gate for deriving the $a_2$ check bit for the three-bit information word above is shown in FIGURE 4. It consists of an EXCLUSIVE OR gate 16 (sometimes also known as a SUM MODULO 2 gate) which receives, as inputs, information bits $x_2$ and $x_0$.

Figure 1A:
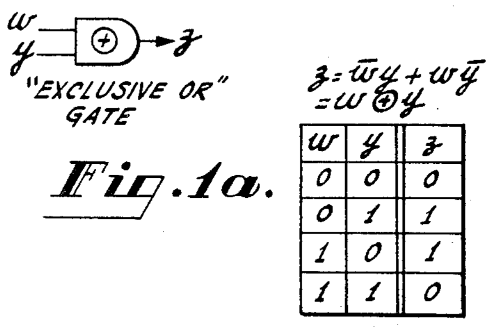

The definition of an EXCLUSIVE OR gate is given in FIGURE 1*a*. This gate receives, as inputs, $w$ and $y$; and its Boolean equation is $z = \bar{w}y + w\bar{y}$. The truth table for the gate also appears in FIGURE 1*a*.

The EXCLUSIVE OR gate of FIGURE 1*a* may be implemented in many different ways. The straightforward implementation shown in many textbooks is with AND and OR gates and inverters. Majority gates or other well-known gates may, of course, be used instead.

The general expression (which follows from specific Equation 1 above) defining the $i$th check bit for an $n$ bit information word $x_0 \ldots x_{n-1}$ is:

$$a_i = x_i \oplus x_{i \underset{n}{\oplus} 1};\ i=0, 1, \ldots (n-1) \qquad (1a)$$

where $\underset{n}{\oplus}$ means sum modulo $n$

From the truth table for the EXCLUSIVE OR gate, Equation 1*a* can be transposed to the following equation:

$$x_i = a_i \oplus x_{i \underset{n}{\oplus} 1};\ i=0, 1, \ldots (n-1) \qquad (2)$$

There can also be derived from Equation 1*a*, by subtracting (sum modulo $n$ subtraction) 1 from each subscript and transposing, the following equation:

$$x_i = a_{i \underset{n}{\ominus} 1} \oplus x_{i \underset{n}{\ominus} 1};\ i=0, 1, \ldots (n-1) \qquad (3)$$

Each bit $x_i$ may be produced from certain of the $x'$ and $a'$ bits in the output $2n$ bit word (FIGURE 2) in any one of the three ways defined by the expressions:

$$x_i = x'_i \qquad (4)$$

$$x_i = a'_i \oplus x'_{i \underset{n}{\oplus} 1} \qquad (5)$$

$$x_i = a'_{i \underset{n}{\ominus} 1} \oplus x'_{i \underset{n}{\ominus} 1} \qquad (6)$$

Equation 4 above is obvious. Equation 5 follows from Equation 2 and Equation 6 follows from Equation 3.

It can be seen from the equations above that there will be a smaller probability of a single error occurring in a bit if, rather than accepting as the correct value of $x_i$ the value specified in a single one of the Equations 4, 5 or 6 above, a value $x_i$ is obtained which is derived from all three equations, as follows:

$$\tilde{x}_i = \text{Maj.}\left(x'_i,\ (a'_i \oplus x'_{i \underset{n}{\oplus} 1}),\ (a'_{i \underset{n}{\ominus} 1} \oplus x'_{i \underset{n}{\ominus} 1})\right) \qquad (7)$$

Figure 5:
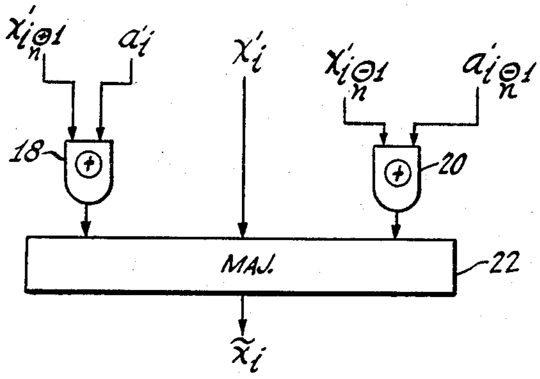
FIGURE 5 is a diagram of a decoder gate for the $i$th information bit $x_i$ in an $n$ bit information transmission system.

The circuit which implements Equation 7 is shown in FIGURE 5. It includes an EXCLUSIVE OR gate 18 which receives, as inputs, the bits $$x'_{i \underset{n}{\oplus} 1} \text{ and } a'_i$$

a second EXCLUSIVE OR gate 20 which receives, as inputs, $$x'_{i \underset{n}{\ominus} 1} \text{ and } a'_{i \underset{n}{\ominus} 1}$$

and a MAJORITY gate 22 which receives, as inputs, the outputs of EXCLUSIVE OR gates 18 and 20 and the bit $x'_i$.

Figure 1B:
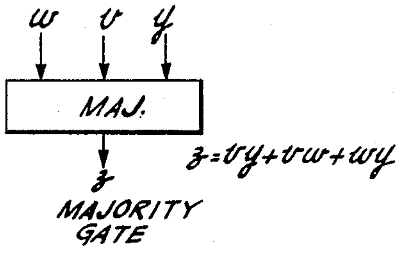

A MAJORITY gate is defined in FIGURE 1*b* by the Boolean equation adjacent to the gate. The equation of FIGURE 1*b* simply says that the value of $z$, the output, is equal to the value of the majority of the inputs $w$, $v$ and $y$. For example, if two or three of the input bits have the value "one," then the output bit $z$ also has the value "one." There are a number of different ways known in the art for implementing MAJORITY gates, including transistor threshold circuits, resistor nets, and so on.

From the definition above, the operation of the circuit of FIGURE 5 should be clear. The value of the output bit $\tilde{x}_i$ is equal to that of the majority of the input bits. In other words, if in Equations 4, 5 and 6, $x_i$ is one value in two or three of the equations, then $\tilde{x}_i$ will also be that value. As will be shown from the specific examples which follow, if there is a single error in one of the input bits to the network of FIGURE 5, it will not affect the value of the output bit. In addition, it can also be shown that if each and every input bit is in error, the output will still be correct. However, $x_i$ may or may not be correct if there is more than one error and less than all errors, as is discussed in detail later.

In the case of a three-bit information word, Equation 7 reduces to the following expression:

$$\tilde{x}_i = \text{Maj.}\left(x'_i,\ (x'_{i \underset{3}{\oplus} 1} \oplus a'_i),\ (x'_{i \underset{3}{\ominus} 1} \oplus a'_{i \underset{3}{\ominus} 1})\right) \qquad (8)$$

The three decoder circuits, one per information bit, defined by Equation 8 are shown in FIGURES 6*a*, 6*b* and 6*c*. The operation of these networks is self-evident from the explanation of FIGURE 5. Assume there is a network such as shown in FIGURE 2 in which $n$ is equal to 3 and in which the decoder 14 consists of three circuits such as shown in FIGURES 6*a*, 6*b* and 6*c*. Assume also that one of the output bits of the transmission channel 12, say $x'_1$, is in error. By definition, this means that $x'_1 = \bar{x}_1$ (the complement of $x_1$). As a result, the MAJORITY gates of FIGURE 6 will have the inputs at leads 23, 25 and 27 shown in the following table:

TABLE I

| Lead | Inputs for FIG. 6*a* | Inputs for FIG. 6*b* | Inputs for FIG. 6*c* |
|---|---|---|---|
| 23 | $x'_1 \oplus a'_0 = \bar{x}_0$ | $x'_2 \oplus a'_1 = x_1$ | $x'_0 \oplus a'_2 = x$ |
| 25 | $x'_0 = x_0$ | $x'_1 = \bar{x}_1$ | $x'_2 = x_2$ |
| 27 | $x'_2 \oplus a'_2 = x_0$ | $x'_0 \oplus a'_0 = x_1$ | $x'_1 \oplus a'_1 = \bar{x}_2$ |

Table I illustrates that the MAJORITY gates of FIGURE 6 each have one erroneous input and two correct inputs. Accordingly, the output of the MAJORITY gate, in each case, will be correct by virtue of the majority principle. It can readily be verified that the illustration above for the single bit $x'_1$ holds for any single error in any one of the transmission channel 12 (FIGURE 2) output bits (either an $x'$ bit or an $a'$ bit). Any such single error is automatically corrected by the decoding network shown in FIGURES 6*a*–6*c* and, in the general case of an $n$ bit word, by the analogous decoder of FIGURE 5.

Returning now to Equation 7, let $D'_i$ denote the set of bits $$(x'_{i \ominus_n 1}, x'_i, x'_{i \oplus_n 1}, a'_{i \ominus_n 1}, a'_i)$$

that are employed in Equation 7 to calculate $\bar{x}_i$. It can be shown that for $n>3$ the decoded output $\bar{x}_i$ of the $N=2n$ bit word $x_0 \ldots x_{n-1}, a_0 \ldots a_{n-1}$ is correct for any one of the following conditions:

(1) There is not more than one error in the five bits of the set $D'_i$.

(2) Exactly three of the bits in the set $D'_i$ are in error, these three bits consisting either of $$(x'_i, x'_{i \oplus_n 1}, a'_i) \text{ or } (x'_{i \ominus_n 1}, a'_{i \ominus_n 1}, x'_i)$$

(3) All of the $2n$ bits at the output of transmission channel 12 are in error.

The proposition (1) above has already been proved for the specific case where $n=3$. It is also provable, merely by observation of FIGURE 5, for the general case. For example, if $a'_i$ in FIGURE 5 is erroneous, EXCLUSIVE OR gate 18 will produce an erroneous output. However, the other two inputs to the MAJORITY gate 22, namely $x'_i$ and the output of EXCLUSIVE OR gate 20, are both correct. Therefore, the output $\bar{x}_i$ is also correct.

Proposition (2) is true because of the EXCLUSIVE OR identity $w \oplus y = \bar{w} \oplus \bar{y}$. (The proof of this identity is self-evident from the truth table of FIGURE 1*a*.) Assume that $$x'_{i \oplus_n 1}, a'_i \text{ and } x'_i$$

are all in error. Then the output of EXCLUSIVE OR gate remains correct, since both of its inputs are in error. Also, the output of gate 20 is correct since both of its inputs are correct. Therefore two of the three inputs to MAJORITY gate 22 are correct and its output $\bar{x}_i$ is correct. The same type of reasoning applies to three incorrect bits $$x'_i, x'_{i \ominus_n 1}, a'_{i \ominus_n 1}$$

With respect to proposition (3) above, if all $2n$ bits are in error, the five input bits of FIGURE 5 are in error, but because of the EXCLUSIVE OR identity $$w \oplus y = \bar{w} \oplus \bar{y}$$

gates 18 and 20 still produce correct outputs. Therefore the MAJORITY gate receives two correct inputs and one incorrect input and produces a correct output $\bar{x}_i$.

It can also be shown that if there are two errors or four errors in the input bits of the arrangement of FIGURE 5, then the output $\bar{x}_i$ will also be incorrect. If $x'_i$ and one of the other four bits is in error, it is clear that the MAJORITY gate 22 will receive two incorrect inputs and that the output $\bar{x}_i$ will therefore be erroneous. If the two inputs to one of the EXCLUSIVE OR gates, such as $$x'_{i \oplus_n 1} \text{ and } a'_i$$

are both in error, the output of gate 18 will not be affected and $\bar{x}_i$ will be correct. However, in this case, the following output bit, namely $$\tilde{x}_{i \oplus_n 1}$$

will be incorrect, because:

$$\tilde{x}_{i \oplus_n 1} = \text{Maj.}\ (x'_{i \oplus_n 1}, x'_{i \oplus_n 2} \oplus a'_{i \oplus_n 1}, x'_i \oplus a'_i) \quad (9)$$

From Equation 9 above, it is clear that the last two terms would cause one erroneous input to the MAJORITY gate in view of the fact that $a'_i$ is incorrect and $x'_i$ is correct. The first term, which is also incorrect, would also cause an erroneous input to the MAJORITY gate. Therefore, $$\tilde{x}_{i \oplus_n 1}$$

would be incorrect since two of the three inputs to the MAJORITY gate would be incorrect. In a similar manner, it can be shown that if the two inputs to gate 20 of FIGURE 5 were incorrect, the following decoded bit $$\tilde{x}_{i \ominus_n 1}$$

would be incorrect in view of the following equation:

$$\tilde{x}_{i \ominus_n 1} = \text{Maj.}\ (x'_{i \ominus_n 1}, x'_i \oplus a'_{i \ominus_n 1}, x'_{i \ominus_n 2} \oplus a'_{i \ominus_n 2}) \quad (10)$$

And it can be shown, also in a similar way, that four erroneous inputs cause an erroneous output.

Summarizing up to this point, a single error in one of the five bits $$a'_{i \ominus_n 1}, a'_i, a'_{i \ominus_n 1}, x'_i, x'_{i \oplus_n 1}$$

in the set $D'_i$ produces no error in $x_i$. Exactly three errors of two particular types (proposition (3) above) produce no error in $\tilde{x}_i$. If two, and only two, errors or four errors, or certain patterns of three errors occur in the five bits, then an error occurs in $\tilde{x}_i$.

It may be observed that in the expression above, $a'_i$ is contiguous to $$a'_{i \ominus_n 1}$$

and that the three $x$'s are also contiguous to one another. Therefore, if a burst error should occur which includes, for example, $$x'_i, x'_{i \oplus_n 1} \text{ or } a'_i, a_{i \ominus_n 1}$$

$\tilde{x}_i$ will be in error. Suppose, however, that the transmitted bits (FIGURE 2) are arranged differently—arranged in such a manner that no three adjacent bits, as transmitted, contain any more than one bit of any $D'_i$. Then, a single burst error of length 3 in the transmitted rearranged string cannot include more than one bit in any set $D'_i$. And, as it has already been proved that a single error in a set $D'_i$ cannot cause an error in the corresponding decoded output bit $x_i$, such a burst error cannot cause an error in $\tilde{x}_i$ either.

As an example, an arrangement suitable for an $N=2n$ bid word in which $n=8$ is:

$$x_0, a_2, x_5, a_7, x_2, a_4, x_7, a_1, x_4, a_6, x_1, a_3, x_6, a_0, x_3, a_5 \quad (11)$$

The pattern in the string above is:

$$x_i, a_{i \oplus_8 2}, x_{i \oplus_8 5}, a_{i \oplus_8 7}, \ldots \text{ for } i=0, 1, \ldots 6, 7 \quad (12)$$

The expression for $D'_i$ remains the same as previously and, in the case in which $n=8$, is defined by the following specific expression:

$$D'_i = (x'_{i \ominus_8 1}, a'_{i \ominus_8 1}, x'_i, a'_i, x'_{i \oplus_8 1}) \quad (13)$$

It can be shown, by inspection, that with the bits arranged as shown in string (11), all error bursts of three bits in an eight-bit $x$ word are corrected. Suppose, for example, that $i=1$. Then the five bits in the substring $D'_i$ (Equation 13, above) will be $x_0$, $x_2$, $a_1$, $x_1$ and $a_0$. The pattern (11, above) shows that these bits are located in the first, fifth, eighth, eleventh and fourteenth positions, respectively, of the rearranged sixteen-bit string. It should be clear, from observation, that it is not possible for a single three-bit burst error to occur which includes any two of these five bits. For example, the first, second and third bits $x_0$, $a_2$, $x_5$ include only $x_0$. The fifth, sixth and seventh bits $x_2$, $a_4$, $x_7$ include only the bit of interest $x_2$, and so on. It can readily be shown that for any $i$, 0 through 7, same holds, namely that a burst error in any three contiguous bits in the rearranged string will cause no error in the decoded bits $\tilde{x}_0 \ldots \tilde{x}_7$. And it can also be shown that in the general case of $n$ bits, where $n$ is a number substantially larger than 8, if the rearranging rules given below are followed, burst errors of length even greater than 3 will cause no errors.

FIGURE 7 shows the details of an encoder 10 (FIGURE 2) which includes rearranging means 32 and also $n$ EXCLUSIVE OR gates $\mathbf{30}_0$ through $\mathbf{30}_{n-1}$. The rearranging means 32 is simply a rearrangement of the input wires which carry the $a$ and $x$ bits so that the output bits follow the pattern shown.

The pattern of bits produced by network 32 is the one transmitted to the transmission channel 12 of FIGURE 2 and, in the case of a memory, is transmitted in parallel. Also in the case of a memory, the bits are stored in adjacent storage locations in the pattern shown. For example, the bit $a_2$ is stored adjacent to $x_0$, the bit $a_5$ adjacent to $x_2$, $a_7$ adjacent to $x_5$, and so on. Therefore, if a burst error should occur due to a group of contiguous bad storage locations, it is likely that the bits stored at these contiguous locations will be incorrect. In other words, as a specific example, if in FIGURE 7 a burst error occurs which is three bits long, it is likely that it will include three contiguous bits such as $$x_i,\ a_{i \underset{n}{\oplus} 2} \text{ and } x_{i \underset{n}{\oplus} 5}$$

or some such other string.

As general proposition, for a word of given length, it is possible to obtain the greatest burst error correcting capability by rearranging an input string $x_0, x_i \ldots x_{n-1}, a_0, a^1, \ldots a_{n-1}$, so that each bit in the string which is part of the set $D'_i$ is spaced the maximum distance (is separated by the maximum number of other bits) from any other bit in that string in the same set $D'_i$. In the rearranged string (11) discussed above, the total number of bits is 16 and it is therefore not possible to separate the two closest bits of set $D'_i$ by more than three other bits. For example, in the case in which $i$ is 3, $a_3$ is the twelfth bit and $x_3$ the fifteenth bit, and there are only three bits between them. Therefore, the system *can* correct a burst error of length 3 which includes $a_3$, $x_6$, $a_0$, but *cannot* correct a burst error of length 4 which includes $a_3$, $x_6$, $a_0$, $x_3$ or, for that matter, any burst error of length 4.

It follows that the larger $n$ is (the greater the length of the input string), the longer the burst error which can be corrected. In more precise mathematical terms, the length B of the burst error which the present system is capable of correcting is:

$$B = \left\lceil \frac{N}{5} \right\rceil - 1$$

where $$\left\lceil \frac{N}{5} \right\rceil$$

is the least integer which is greater than or equal to $$\frac{N}{5}$$

There are two formal mathematical rules which may be followed to realize the greatest error correcting capability from the circuit (maximum B). Rule 1 is valid for any input word in which $n$ is *not* divisible by 5. Rule 2 is valid for any input word in which $n$ is divisible by 5.

*Rule I.*—Each $x_i$ in the code word is followed by $$a_{i \underset{n}{\oplus} 2}$$

and each $a_j$ is followed by $$x_{j \underset{n}{\oplus} 3}$$

The initial bit (the left-most bit of the string) may be chosen arbitrarily, that is, it can be any one of the $x$ bits or any one of the $a$ bits.

Rule I does not hold for the case in which $n$ is divisible by 5 because a bit initially selected is reached again before all bits are exhausted. In other words, if Rule I were followed, some bits would be left out of the rearranged string. In mathematical terms, when $n$ is divisible by 5, the string segment $\phi_i$ is:

$$\phi_i = x_i,\ a_{i \underset{n}{\oplus} 2},\ x_{i \underset{n}{\oplus} 5},\ a_{i \underset{n}{\oplus} 7} \ldots x_{i \underset{n}{\oplus} (n \underset{n}{\ominus} 5)},\ a_{i \underset{n}{\oplus} (n \underset{n}{\ominus} 3)} \quad (14)$$

In this pattern, the bit next to $$a_{i \underset{n}{\oplus} (n \underset{n}{\ominus} 3)} \text{ is } x_{i \underset{n}{\oplus} n} \equiv x_i$$

The same holds for the case in which the initial bit of the segment is chosen as $a_j$, $0 \leq j \leq n-1$.

Rule II.—To avoid the difficulty above in the special case in which $n$ is divisible by 5, each new segment $$\phi_{i \underset{n}{\oplus} 1}$$

is started with $$x_{i \underset{n}{\oplus} 1}$$

$$(\text{or } a_{j \underset{n}{\oplus} 1})$$

as the next bit. This process of segment construction is continued until all of the $2n$ bits are exhausted. Stated generally, the burst error correction code generated, that is, the rearranged word of FIGURE 7, is poduced in the case in which $n$ is divisible by 5 by the concatenation of five segments:

$$(\phi,\ \phi_{i \underset{n}{\oplus} 1},\ \ldots\ \phi_{i \underset{n}{\oplus} 4})$$

In the discussion up to this point, the maximum burst error correction feature of the present invention has been stressed and the rules for achieving this capability have been given. However, in special situations, other types of predictable errors may be more likely to occur. It may be, to take a very special case, that errors are likely to occur only in each group of two adjacent bits followed by a third bit which is spaced one bit from the adjacent pair. To illustrate, in a coded string:

$$x_{i \underset{n}{\ominus} 1},\ x_i,\ x_{i \underset{n}{\oplus} 1},\ a_{i \underset{n}{\ominus} 1},\ a_i,\ a_{i \underset{n}{\oplus} 1}$$

errors may be likely to occur in a string $$x_{i \underset{n}{\oplus} 1},\ a_{i \underset{n}{\ominus} 1},\ a_{i \underset{n}{\oplus} 1} \text{ or } x_i,\ x_{i \underset{n}{\oplus} 1},\ a_i$$

and so on. It is possible to lessen the possibility of or to avoid (depending on the value of $n$) such errors, or any others, for that matter, by following the general principles of the present invention, that is, by appropriate encoding, rearrangement of the $x$ and $a$ bits, and decoding. The rearranging rule which should be followed is to so arrange the bits in the string that not more than one bit of the set $D'_i$ is in error. If one can predict the types of errors which are likely to occur and one has enough bits to work with (if $n$ is sufficiently large), one can insure that there will be no errors. In other cases, one can at least substantially lessen the possibility of errors.

Summarizing the features of the present invention, as applied to the maximum burst error correction system:

(1) Any single error in an $x$ or an $a$ bit is corrected.

(2) Special groups of three errors in $x$ and $a$ bits are corrected.

(3) Bursts of errors of length $$B \leq \left\lceil \frac{N}{5} \right\rceil - 1$$

are corrected.

(4) Numbers of other errors, not enumerated here, all special cases, are corrected.

It has been calculated that in a code word of length 80 ($n=40$) the number of errors the present system can correct is greater than $2^{21}$ and less than $2^{22}$ (this is the total number of errors in all four categories above).

In addition to the above, the system can be designed to discriminate against errors of special type, other than maximum burst errors, if desired, by following the general rules given above.

What is claimed is:

1. Apparatus for encoding and decoding an $n$ bit word $x_0, x_1, \ldots x_{n-1}$ comprising, in combination,
   means receptive of said $n$ bit $x$ word for generating for each $i$th bit $x_i$ of the word a check bit $$c_i = x_i \oplus x_{i \underset{n}{\oplus} 1}$$

and for transmitting these $x$ and $c$ bits; and
   means for receiving $x'$ and $c'$ bits, which may or may not be equal in value to the corresponding $x$ and $c$ bits which were transmitted, for deriving from each group of bits $$x'_{i \underset{n}{\ominus} 1}, x'_i, x'_{i \underset{n}{\oplus} 1}, c'_{i \underset{n}{\ominus} 1}, c'_i$$

an output bit $$\tilde{x}_i = \text{Maj.}\ (x'_i, x'_{i \underset{n}{\oplus} 1} \oplus c'_i, x'_{i \underset{n}{\ominus} 1} \oplus c'_{i \underset{n}{\ominus} 1})$$

where:
   $n$ is an integer;
   $i$ is an integer having the $n$ consecutive values $0, 1, \ldots n-1$;
   $\oplus$ represents the modulo 2 sum;
   $\underset{n}{\oplus}$ represents the modulo $n$ sum;
   $\underset{n}{\ominus}$ represents the modulo $n$ difference; and
   Maj. represents the majority function.

2. Apparatus for encoding and decoding an $n$ bit string of consecutive bits $x_0, x_1, \ldots x_{n-1}$ comprising, in combination,
   means receptive of the $n$ bit string for generating for each $i$th bit $x_i$ of the string a check bit $$c_i = x_i \oplus x_{i \underset{n}{\oplus} 1}$$

means for interleaving the $x$ and $c$ bits into a string of $2n$ bits in which each $i$th $x$ bit is followed by an $$(i \underset{n}{\oplus} k)^{th}$$

$c$ bit, and each $j$th $c$ bit is followed by a $$(j \underset{n}{\oplus} m)^{th}$$

$x$ bit and for transmitting this string of bits; and
   means for receiving a string of $x'$ and $c'$ bits, which may or may not be equal in value to the corresponding string of $x$ and $c$ bits which were transmitted for deriving from each group of bits $$x'_{i \underset{n}{\ominus} 1}, x'_i, x'_{i \underset{n}{\oplus} 1}, c'_{i \underset{n}{\ominus} 1}, c'_i$$

an output bit $$\tilde{x}_i = \text{Maj.}\ (x'_i, x'_{i \underset{n}{\oplus} 1} \oplus c'_i, x'_{i \underset{n}{\ominus} 1} \oplus c'_{i \underset{n}{\ominus} 1})$$

where:
   $n$ is an integer;
   $i$ and $j$ are integers each of which has the $n$ values $0, 1, \ldots n-1$;
   $k$ and $m$ are integers having a value at least equal to 2;
   $\oplus$ represents the modulo 2 sum;
   $\underset{n}{\oplus}$ represents the modulo $n$ sum;
   $\underset{n}{\ominus}$ represents the modulo $n$ difference; and
   Maj. represents the majority function.

3. Apparatus for encoding and decoding an $n$ bit parallel string of consecutive bits $x_0, x_1, \ldots x_{n-1}$ comprising, in combination,
   means receptive of the $n$ bit string for generating for each $i$th bit $x_i$ of the string a check bit $$c_i = x_i \oplus x_{i \underset{n}{\oplus} 1}$$

means for interleaving the $x$ and $c$ bits into a string of $2n$ bits in which each $i$th $x$ bit is followed by an $$(i \underset{n}{\oplus} 2)\text{nd}$$

$c$ bit, and each $j$th $c$ bit is followed by a $$(j \underset{n}{\oplus} 3)\text{rd}$$

$x$ bit and for transmitting this string of $2n$ bits; and
   means receptive of a string of $x'$ and $c'$ bits, which may or may not be equal in value to the corresponding string of the $x$ and $c$ bits which were transmitted, for deriving from each group of bits $$x'_{i \underset{n}{\ominus} 1}, x_i', x'_{i \underset{n}{\oplus} 1}, c'_{i \underset{n}{\ominus} 1}, c'_i$$

an output bit $$\tilde{x}_i = \text{Maj.}\ (x'_i, x'_{i \underset{n}{\oplus} 1} \oplus c'_i, x'_{i \ominus n 1} \oplus c'_{i \underset{n}{\ominus} 1})$$

where:
   $n$ is an integer;
   $i$ and $j$ are integers each of which has the $n$ values $0, 1, \ldots n-1$;
   $\oplus$ represents the modulo 2 sum;
   $\underset{n}{\oplus}$ represents the modulo $n$ sum
   $\underset{n}{\ominus}$ represents the modulo $n$ difference; and
   Maj. represents the majority function.

4. Apparatus for encoding and decoding an $n$ bit string of consecutive bits $x_0, x_1, \ldots x_{n-1}$ comprising, in combination,
   means receptive of the $n$ bit string for generating for each $i$th bit $x_i$ of the string a check bit $$c_i = x_i \oplus x_{i \underset{n}{\oplus} 1}$$

means for rearranging the $x$ and $c$ bits into a string of $2n$ bits in non-consecutive order and for transmitting this string of bits; and
   means receptive of a string of $x'$ and $c'$ bits, which may or may not be equal in value to the corresponding transmitted $x$ and $c$ bits, for deriving from each group of bits $$x'_{i \underset{n}{\ominus} 1}, x', x'_{i \underset{n}{\oplus} 1}, c'_{i \underset{n}{\ominus} 1}, c'_i$$

an output bit $$\tilde{x}_i = \text{Maj.}\,(x'_i,\ x'_{i\underset{n}{\oplus}1} \oplus c'_i,\ x'_{i\underset{n}{\ominus}1} \oplus c'_{i\underset{n}{\ominus}1})$$

where:

$n$ is an integer;

$i$ and $j$ are integers each of which has the $n$ values $0, 1, \ldots, n-1$;

$\oplus$ represents the modulo 2 sum;

$\underset{n}{\oplus}$ represents the modulo $n$ sum;

$\underset{n}{\ominus}$ represents the modulo $n$ difference; and

Maj. represents the majority function.

References Cited

UNITED STATES PATENTS

| | | | |
|---|---|---|---|
| 2,956,124 | 10/1960 | Hagelbarger | 340—146.1 X |
| 3,164,804 | 1/1965 | Burton et al | 340—146.1 |
| 3,222,644 | 12/1965 | Burton et al | 340—146.1 |

MALCOLM A. MORRISON, *Primary Examiner.*

C. E. ATKINSON, *Assistant Examiner*

U.S. DEPARTMENT OF COMMERCE

PATENT OFFICE

Washington, D.C. 20231

UNITED STATES PATENT OFFICE

CERTIFICATE OF CORRECTION

Patent No. 3,404,373 October 1, 1968

Chitoor V. Srinivasan

It is certified that error appears in the above identified patent and that said Letters Patent are hereby corrected as shown below:

Column 2, line 67, "$x_0 \ldots x_{n-1}$" should read -- $\tilde{x}_0 \ldots \tilde{x}_{n-1}$ --. Column 4, lines 1 and 44 to 46, and column 6, lines 25 and 50, "$x_i$", each occurrence, should read -- $\tilde{x}_i$ --. Column 4, TABLE I, fourth column, line 1 thereof, "$x'_0 \oplus a'_2 = x$" should read -- $x'_0 \oplus a'_2 = x_2$ --. Column 5, lines 7 and 8, "$\bar{x}_1$", each occurrence, should read -- $\tilde{x}_i$ --; line 8, "$n>3$" should read -- $n \geq 3$ --; lines 27, 52, 55, 58 and 64, "$\bar{x}_i$", each occurrence, should read -- $\tilde{x}_i$ --. Column 6, line 54, "bid" should read -- bit --.

Signed and sealed this 24th day of March 1970.

(SEAL)
Attest:

Edward M. Fletcher, Jr.
Attesting Officer

WILLIAM E. SCHUYLER, JR.
Commissioner of Patents